US006804618B2

(12) United States Patent
Junk (10) Patent No.: US 6,804,618 B2
(45) Date of Patent: Oct. 12, 2004

(54) DETECTION AND DISCRIMINATION OF INSTABILITIES IN PROCESS CONTROL LOOPS

(75) Inventor: Kenneth W. Junk, Marshalltown, IA (US)

(73) Assignee: Fisher Controls International, LLC, St. Louis, MO (US)

( * ) Notice: Subject to any disclaimer, the term of this patent is extended or adjusted under 35 U.S.C. 154(b) by 103 days.

(21) Appl. No.: 10/006,955

(22) Filed: Dec. 5, 2001

(65) Prior Publication Data

US 2002/0040284 A1 Apr. 4, 2002

Related U.S. Application Data

(63) Continuation-in-part of application No. 09/370,474, filed on Aug. 9, 1999, which is a continuation-in-part of application No. 08/939,364, filed on Sep. 29, 1997, now Pat. No. 5,966,679.
(60) Provisional application No. 60/098,464, filed on Aug. 31, 1998.

(51) Int. Cl.[7] .............................................. G06F 19/00
(52) U.S. Cl. ...................................... 702/77; 702/182
(58) Field of Search ......................... 702/77, 33, 35, 702/41, 42, 43, 44, 57, 58, 59, 138, 179, 181, 182–185

(56) References Cited

U.S. PATENT DOCUMENTS

| 4,029,122 A | 6/1977 | Jaegtnes ..................... 137/551 |
| 4,313,465 A | 2/1982 | Holzem et al. .............. 137/599 |
| 4,376,450 A | 3/1983 | Fayfield et al. ............. 137/554 |
| 4,523,286 A | 6/1985 | Koga et al. .................. 364/494 |
| 4,542,649 A | 9/1985 | Charbonneau et al. ........ 73/168 |
| 4,555,766 A | 11/1985 | Wright ....................... 364/426 |
| 4,556,956 A | 12/1985 | Dickenson et al. .......... 364/162 |
| 4,590,963 A | 5/1986 | Gardner et al. .............. 137/554 |
| 4,615,722 A | 10/1986 | Steffan et al. ................ 65/158 |
| 4,617,960 A | 10/1986 | More .......................... 137/554 |
| 4,660,416 A | 4/1987 | Charbonneau et al. ........ 73/168 |
| 4,672,529 A | 6/1987 | Kupersmit ................... 364/130 |
| 4,690,003 A | 9/1987 | McNennamy et al. ... 73/862.32 |
| 4,693,113 A | 9/1987 | McNennamy et al. ........ 73/168 |
| 4,694,390 A | 9/1987 | Lee ............................ 364/165 |
| 4,694,391 A | 9/1987 | Guttag et al. ............... 364/200 |
| 4,712,071 A | 12/1987 | Charbonneau et al. ...... 324/415 |
| 4,742,713 A | 5/1988 | Abe et al. ..................... 73/620 |

(List continued on next page.)

FOREIGN PATENT DOCUMENTS

| DE | 42 32 826 C1 | 10/1993 |
| DE | 42 18 320 A1 | 12/1993 |
| EP | 0 275 629 A1 | 7/1988 |

(List continued on next page.)

OTHER PUBLICATIONS

Isermann et al., "Adaptive Control Systems," Prentice Hall, pp. 488–492 and 528–531 (1992).

(List continued on next page.)

*Primary Examiner*—Marc S. Hoff
*Assistant Examiner*—Edward Raymond
(74) *Attorney, Agent, or Firm*—Marshall, Gerstein & Borun LLP (57) ABSTRACT

A method and apparatus determines the presence of and source of instabilities, such as limit cycles, within a process control loop while the process control loop operates on-line within a process environment. The method and apparatus measures one or more signals within a process control loop when the process control loop is connected on-line within a process control environment, stores the measured signal as signal data and then performs one or more statistical analyses on the stored signal data to determine whether instabilities exist and, if so, whether the source of an instability is within a servo loop or outside of a servo loop and is due to friction, external forces or mechanical anomalies.

28 Claims, 5 Drawing Sheets

U.S. PATENT DOCUMENTS

| | | | |
|---|---|---|---|
| 4,831,873 A | 5/1989 | Charbonneau et al. ........ 73/168 |
| 4,833,593 A | 5/1989 | Takeuchi et al. ............ 364/191 |
| 4,858,103 A | 8/1989 | Takeuchi et al. ............ 364/174 |
| 4,885,676 A | 12/1989 | Zweighaft |
| 4,908,774 A | 3/1990 | Lund et al. .................. 364/507 |
| 4,908,775 A | 3/1990 | Palusamy et al. ........... 364/508 |
| 4,916,628 A | 4/1990 | Kugler ........................ 364/492 |
| 4,926,903 A | 5/1990 | Kawai ........................ 137/554 |
| 4,949,288 A | 8/1990 | Bookout ..................... 364/558 |
| 4,976,144 A | 12/1990 | Fitzgerald .................... 73/168 |
| 4,977,778 A | 12/1990 | Nafziger et al. .............. 73/597 |
| 4,980,825 A | 12/1990 | Tootell et al. ............... 364/580 |
| 5,000,040 A | 3/1991 | Charbonneau et al. ........ 73/168 |
| 5,086,273 A | 2/1992 | Leon ..................... 324/207.17 |
| 5,109,692 A | 5/1992 | Fitzgerald .................... 73/168 |
| 5,140,263 A | 8/1992 | Leon ..................... 324/207.17 |
| 5,154,080 A | 10/1992 | Hill et al. ..................... 73/597 |
| 5,159,835 A | 11/1992 | Nafziger et al. .............. 73/584 |
| 5,197,328 A | 3/1993 | Fitzgerald .................... 73/168 |
| 5,198,973 A | 3/1993 | Steutermann .......... 364/167.01 |
| 5,228,342 A | 7/1993 | McShane ..................... 73/597 |
| 5,233,542 A | 8/1993 | Höhner et al. ......... 364/551.01 |
| 5,251,148 A | 10/1993 | Haines et al. ............... 364/509 |
| 5,253,185 A | 10/1993 | Mutchler et al. ...... 364/551.01 |
| 5,272,647 A | 12/1993 | Hayes ................... 364/551.01 |
| 5,272,649 A | 12/1993 | Campbell et al. |
| 5,320,123 A | 6/1994 | Corso et al. .................... 137/1 |
| 5,329,465 A | 7/1994 | Arcella et al. ......... 364/551.01 |
| 5,329,956 A | 7/1994 | Marriott et al. ............... 137/15 |
| 5,337,262 A | 8/1994 | Luthi et al. .................. 364/580 |
| 5,396,167 A | 3/1995 | Leon ......................... 324/73.1 |
| 5,414,648 A | 5/1995 | Morgan et al. ............. 364/563 |
| 5,425,270 A | 6/1995 | McDonald et al. ............ 73/168 |
| 5,433,245 A | 7/1995 | Prather et al. ............... 137/554 |
| 5,451,923 A | 9/1995 | Seberger et al. ....... 340/310.06 |
| 5,475,299 A | 12/1995 | Leon ......................... 324/73.1 |
| 5,477,149 A | 12/1995 | Spencer et al. ............. 324/418 |
| 5,487,302 A | 1/1996 | Casada et al. ................. 73/168 |
| 5,553,153 A | 9/1996 | Eatwell ....................... 381/71 |
| 5,555,171 A | 9/1996 | Sonehara et al. ...... 364/424.03 |
| 5,557,546 A | 9/1996 | Fukai et al. ........... 364/551.01 |
| 5,564,470 A | 10/1996 | Denmark et al. ........... 137/554 |
| 5,586,305 A | 12/1996 | Eidson et al. ............... 395/500 |
| 5,687,098 A | 11/1997 | Grumstrup et al. .... 364/551.01 |
| 5,838,561 A | * 11/1998 | Owen .......................... 700/32 |
| 5,966,679 A | 10/1999 | Snowbarger et al. ....... 702/105 |
| 6,128,541 A | 10/2000 | Junk ........................... 700/39 |
| 6,192,321 B1 | * 2/2001 | Grumstrup et al. ......... 702/113 |

FOREIGN PATENT DOCUMENTS

| | | |
|---|---|---|
| EP | 0 315 391 A2 | 5/1989 |
| EP | 0 334 698 A2 | 9/1989 |
| EP | 0 462 432 A2 | 12/1991 |
| EP | 0 572 245 A2 | 12/1993 |
| EP | 0 637 713 A1 | 2/1995 |
| EP | 0 660 017 A1 | 6/1995 |
| EP | 0 708 389 A1 | 4/1996 |
| GB | 2 194 648 A | 3/1988 |
| GB | 2 196 445 A | 4/1988 |
| JP | 62 229 044 A | 10/1987 |
| WO | WO 97/16776 | 5/1997 |
| WO | WO 99/17177 | 4/1999 |

OTHER PUBLICATIONS

Anderson, "The Deviation Cycle" *ISA Journal* pp. 49–51 (1966).

Charbonneau, "Early Diagnosis of Motor Operated Valve Mechanical and Electrical Degradations," The American Society of Mechanical Engineers, 84–NE–16, pp. 1–6 (1984).

Fieldvue ™ Digital Valve Controller Type DVC5000 Series Bulletin 62.1:DVC5000 pp. 1–12 (1994).

Fieldvue ™ Digital Valve Controller Type DVC5000 Series Instruction Manual p. 38 (1995).

Fieldvue ™ Digital Valve Controller DVC5000 Series Remotely Accessible Information Bulletin 62.1:DVC5000(S1) pp. 1–2 (1994).

Prepared by Foster–Miller, Inc., "Improvement in Motor-–operated Valves" *Electric Power Research Institute* (1985).

Beatty, "Intelligent Valve Based Process Sensing and Control" *ISA, 1991* pp. 1175–1185 (1991).

Prepared by Burns and Roe, Inc., "Key Valves Prioritization Study" *Electric Power Research Institute* (1984).

Dimmick et al., "Ultrasonic leak detection cuts valve maintenance costs" *Power Engineering Aug. 1966* pp. 35–38 Aug. 1986.

U.S. patent application Ser. No. 06/913,193 entitled "Motor Current Signature Analysis Method for Diagnosing Motor-–Operated Devices".

Skormin et al., "On–Line Diagnostics of a Self–Contained Flight Actuator," *IEEE Transactions on Aerospace and Electronic Systems*, vol. 30, No. 1, pp. 186–196, Jan. 1994.

Copy of International Search Report, dated Jan. 3, 2003, for International patent application No. PCT/US02/32745, 3 pages.

* cited by examiner

DETECTION AND DISCRIMINATION OF INSTABILITIES IN PROCESS CONTROL LOOPS

RELATED APPLICATIONS

This is a continuation in part of U.S. patent application Ser. No. 09/370,474 filed Aug. 9, 1999 entitled "Statistical Determination of Estimates of Process Control Loop Parameters" which is a continuation in part of U.S. patent application Ser. No. 08/939,364 filed Sep. 29, 1997, now U.S. Pat. No. 5,966,679, entitled "Method of and Apparatus for Nonobtrusively Obtaining On-Line Measurements of a Process Control Device Parameter" and which is also a regular filed application based on Provisional Application No. 60/098,464 filed Aug. 31, 1998 entitled "Statistical Determination of Estimates of Process Control Loop Parameters."

TECHNICAL FIELD

The present invention relates generally to process control networks and, more particularly, to a method of and an apparatus for determining causes of instabilities such as limit cycles within a process control loop while, for example, the process control loop is connected on-line within a process environment.

BACKGROUND ART

Large scale commercial manufacturing and refining processes typically use process controllers to control the operation of one or more process control devices such as valves, based on feedback from one or more sensors, such as flow, temperature or other types of sensors. Each set of such controller, valve and sensor devices forms what is generally referred to as a process control loop. Furthermore, each valve or other device may, in turn, include an inner loop wherein, for example, a valve positioner controls a valve actuator to move a control element, such as a valve plug, in response to a control signal and obtains feedback from a sensor, such as a position sensor, to control movement of the valve plug. This inner loop is sometimes called a servo loop. In any event, the control element of a process control device may move in response to changing fluid pressure on a spring biased diaphragm or in response to the rotation of a shaft, each of which may be caused by a change in the command signal. In one standard valve mechanism, a command signal with a magnitude varying in the range of 4 to 20 mA (milliamperes) causes a positioner to alter the amount of fluid and thus, the fluid pressure, within a pressure chamber in proportion to the magnitude of the command signal. Changing fluid pressure in the pressure chamber causes a diaphragm to move against a bias spring which, in turn, causes movement of a valve plug.

Process control devices usually develop or produce a feedback signal, indicative of the response of the device to the command signal, and provide this feedback signal (or response indication) to the process controller or to the valve actuator for use in controlling the process or the valve. For example, valve mechanisms typically produce a feedback signal indicative of the position (e.g., travel) of a valve plug, the pressure within a fluid chamber of the valve or the value of some other phenomena related to the actual position of the valve plug.

While a process controller generally uses these feedback signals, along with other signals, as inputs to a highly tuned, centralized control algorithm that effects overall control of a process, it has been discovered that poor control loop performance may still be caused by poor operating conditions of the individual control devices connected within the control loop including, for example, instabilities within the process control loop. A system experiences an "instability" when it cannot reach an equilibrium point during operation. Plant personnel often refer to these instabilities as cycling, hunting, or swinging which is in contrast with normal operation in which the system reaches an equilibrium point or "lines-out."

In many cases, problems associated with one or more of the individual process control devices cannot be tuned out of the control loop by the process controller and, as a result, the poorly performing control loops are placed in manual or are detuned to the point where they are effectively in manual. In some cases, plant personnel can track down individual loops that are cycling and will detune the associated controller or place the faulty loop into manual. If the system settles down, they know that it is a tuning problem, not a hardware problem. In a similar fashion, if the process has well known, fast dynamics (such as a flow loop), operators will correlate the controller output with the process variable. If the output of the controller is a triangle wave and the process variable is a square wave, they will often conclude that the control valve is sticking. These ad-hoc procedures are used by many plant operators, but include several limitations. For example, the first procedure requires the operator to put the system into manual, which may not be allowed, especially on runaway processes. The second procedure is good for identifying limit cycles induced by the process control loop but is not capable of tracking down instabilities in the servo loop. Moreover, correlation between a command signal and a process variable is not always straightforward due to complications such as integrating process dynamics, non-linear process dynamics, cross-coupled process dynamics, and process disturbances. Instabilities in the servo loop can be particularly difficult to discern because plant personnel do not have access to the internal state variables of a control valve. Additional problems arise when instabilities are influenced by the process fluid, as is the case with negative gradients. In these situations, a valve can oscillate when in service, but becomes well behaved when it is taken off line.

Poor control loop performance can usually be overcome by monitoring the operational condition or the "health" of each of the process control devices connected within the loop, or at least the most critical process control devices connected within the loop, and repairing or replacing the poorly performing process control devices. The health of a process control device can be determined by measuring one or more parameters associated with the process control device and determining if the one or more parameters is outside of an acceptable range. One of the problems that may be monitored is the detection of instabilities in a process loop or a control device. Such instabilities may be the result of, for example, limit cycles which cause the loop to oscillate.

In particular, the term limit cycle generally refers to undesirable cyclical movements of a moveable element within a process control device, such as a sliding stem valve. There are many causes of limit cycles including, for example, external forces, friction and mechanical anomalies. External forces, such as buffeting or jet streams or other forces which place a negative gradient on, for example, a valve plug, may cause movement of the element, which is then compensated for by the control mechanism either within or outside of the servo loop. Friction, for example, increased friction caused by side loading on the moveable element, may prevent initial movement of the element thereby causing the control mechanism to increase the pressure on the moveable element. This increased pressure causes overshoot and, thereby, initiates cyclical movement of the element. Mechanical or device anomalies may include interactions between actuator pneumatics and those of supporting equipment such as air supply regulators, volume boosters or quick-release valves or other anomalies involving the supporting equipment. In summary, limit cycles may be caused by a process control loop itself, by external forces, valve accessories, friction, etc.

In the past, it was not easy to determine the source or cause of an instablity within a process control loop without having a technician review and diagnose the system, which could be time consuming and costly. In some cases these persons had to remove a process control device from a control loop to bench test the device or, alternatively, the control loops themselves were provided with bypass valves and redundant process control devices to make it possible to bypass a particular process control device to thereby test a device while the process is operating. Alternatively, operators have had to wait until a process is halted or is undergoing a scheduled shut-down to test the individual process control devices within the process which might be the source of an instability. Each of these options is time consuming, expensive, and only provides intermittent determination of instabilities in a system. Still further, none of these methods is particularly suited to determine the source or cause of an instability while the process is operating on-line, i.e., without disturbing or shutting the process down.

There have been some attempts to collect data from a process control device on-line and to obtain an indication of characteristics of a device therefrom. For example, U.S. Pat. No. 5,687,098 to Grumstrup et al. discloses a system that collects device data and constructs and displays the response characteristic of the device. Likewise, application Ser. No. 08/939,364 filed Sep. 29, 1997 entitled "Method of and Apparatus for Nonobtrusively Obtaining On-Line Measurements of a Process Control Device Parameter," upon which this application relies for priority purposes, discloses a system that collects device data on-line and uses this data to directly calculate certain device parameters, such as dead band, dead time, etc. The disclosure of this application specifically related to an apparatus and method for obtaining on-line measurements of a process control device parameters (i.e., the disclosure related to FIGS. 1–3) is hereby expressly incorporated by reference herein. Furthermore, the disclosure of U.S. patent application Ser. No. 09/370,474 filed Aug. 9, 1999 entitled "Statistical Determination of Estimates of Process Control Loop Parameters" is also hereby expressly incorporated by reference herein. However, none of the known prior art methods or systems determines the causes of instabilities within a process control system, especially when the process control system is operating on-line.

SUMMARY

A method and an apparatus detects or determines the cause or source of instabilities within a process control system or a process control device while the process control loop is connected on-line within a process environment. The method and apparatus make certain measurements of inputs to or outputs from a process control loop or process control device, such as a valve, during the occurrence of an instability and use the collected data to determine the existence of or the source of the instability. This system enables a process operator to nonobtrusively monitor one or more process control devices or loops within a process in a continuous manner to determine the causes or sources of instabilities without having to remove the process control devices from the control loop, without having to bypass the process control devices in the control loop, without having to superimpose test signals into the control loop and without having to shut the process down or interfere with the process in other ways.

In one embodiment, a method of and apparatus for determining a source of an instability within a process control loop determines if the instability is caused within a servo loop or outside of a servo loop of a process control loop. Still further, the system and method may determine if an instability within, for example, a servo loop is caused by external forces, friction or mechanical anomalies. The system and method may perform the determination by examining whether relevant pressure and travel signals are positively or are negatively correlated, by determining whether an actuator pressure measurement leads or lags a valve travel measurement, etc.

DETAILED DESCRIPTION

Figure 1:
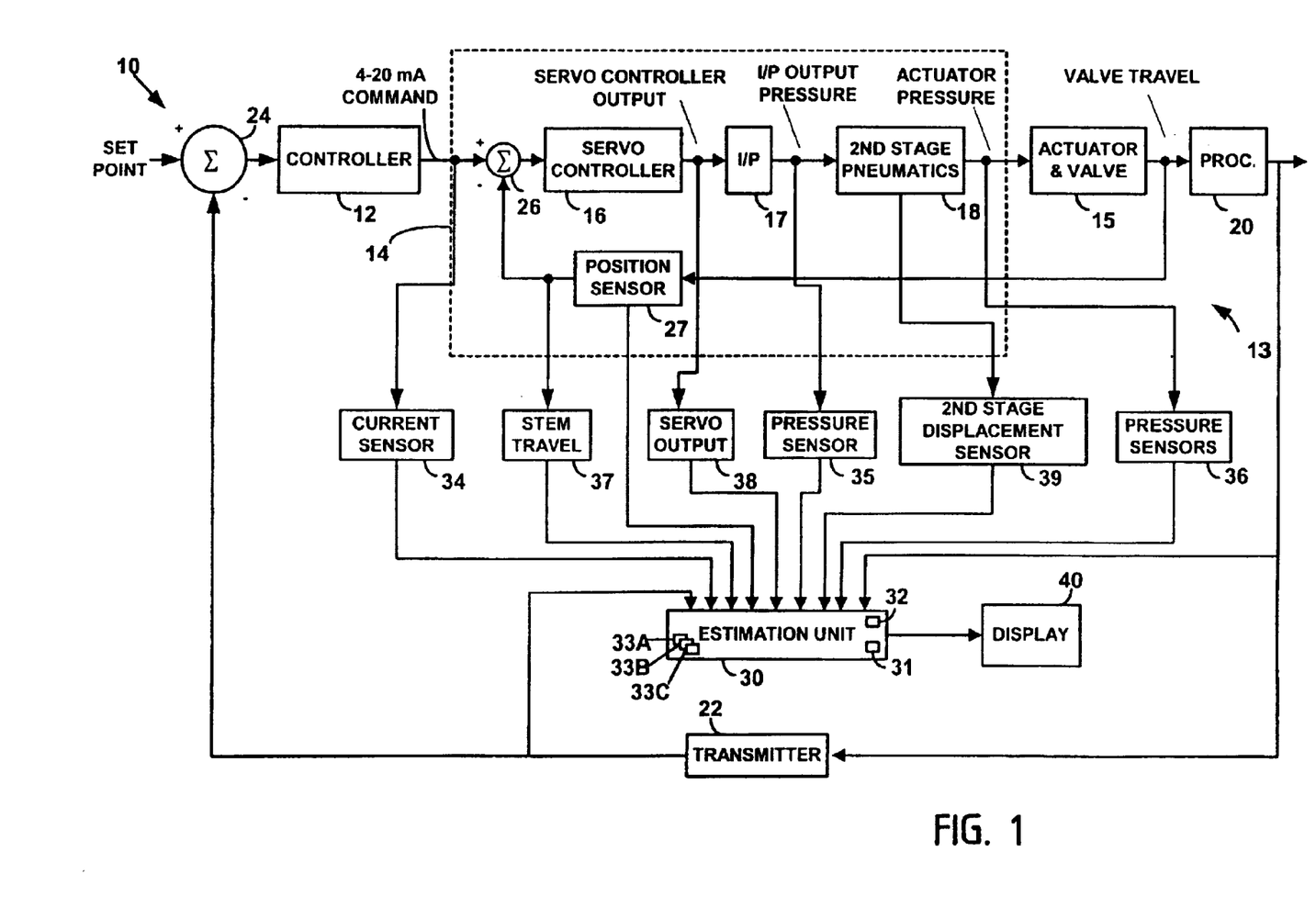
FIG. 1 is a block diagram of a process control loop including a device that determines the presence of and sources of instabilities within a process control loop or device.

Referring to FIG. 1, a single-input, single-output process control loop 10 is illustrated as including a process controller 12 that sends, for example, a 4 to 20 mA command signal to a process control device 13. The process control device 13, which may include a digital positioner 14 and a control valve with a valve actuator 15, is illustrated as including a servo controller 16 that sends a servo controller output to a current to pressure (I/P) transducer 17. The I/P transducer 17 sends a first stage pressure signal to second stage pneumatics 18 which may be, for example, a spool valve or a pneumatic relay. The second stage pneumatics 18, in turn, pneumatically control the valve actuator and valve 15 with a pressure signal (pressurized air, for example). Operation of the valve 15 controls the articulation of a movable valve member such as a valve stem disposed therein (not shown) which, in turn, controls a process variable within a process 20. As is standard, a transmitter 22 measures the process variable of the process 20 and transmits an indication of the measured process variable to a summing junction 24 associated with the controller 12. The summing junction 24 compares the measured value of the process variable (converted into a normalized percentage) to a set point to produce an error signal indicative of the difference therebetween. The summing junction 24 then provides the calculated error signal to the process controller 12. The set point, which may be generated by a user, an operator or another controller, is typically normalized to be between 0 and 100 percent and indicates the desired value of the process variable. The process controller 12 uses the error signal to generate the command signal according to any desired technique and delivers the command signal to the device 14 where it is summed in a summing junction 26 with a signal produced by a position sensor 27 indicative of the actual or present position of the valve stem. The summing junction 26 produces an error signal which is delivered to the servo controller 16 to thereby effect control of the process variable.

While the process control device 13 is illustrated as including a positioner 14 having an integrated I/P unit 17, the process control device 13 may include any other type of valve mechanisms or elements instead of or in addition to those illustrated in FIG. 1 including, for example, a device having a stand-alone positioner and I/P unit. Furthermore, it should be understood that the process control device 13 may be any other type of device (besides a valve-type device) that controls a process variable in any other desired or known manner. The process control device 13 may be, for example, a damper, etc.

An estimation unit 30, which may detect the presence of and determine the source of instabilities in the process loop 10 or, in many cases, in the process control device 13 itself, is coupled to the process control device 13 or to any other part of the process control loop 10 using known sensors. The estimation unit 30, which may include a computer such as a microcomputer having a memory 31 and a processor 32 therein, collects data pertaining to one or more of the signals within the process control loop 10 and determines from the collected data the presence of instabilities and an estimate of the source of instabilities within the process control system 10 or device 13 using, for example, one or more computer programs or algorithms 33 stored in the memory 31 and adapted to be executed on the processor 32.

As illustrated in FIG. 1, the estimation unit 30 may detect one or more of the command signal delivered to the summing junction 26 using a current sensor 34, the pressure output from the I/P unit 17 using a pressure sensor 35, the actuator command signal output by the second stage pneumatics 18 using one or more pressure sensors 36, and the valve position at the output of the valve 15 using the position sensor 27. Still further, the stem travel may be determined or measured by a stem travel sensor 37 using the output of the position sensor 27. A servo output unit 38 may monitor the output of the servo controller 16 and provide this measurement to the estimation unit 30. The servo output unit 38 may make a physical measurement of the current going to the I/P unit 17 or may send the digital output from the control algorithm within the servo controller 16. Still further, a second stage displacement sensor 39, which may be for example, a Hall effect device, is used to measure the displacement of a spool valve or relay within the second stage pneumatics 18. Of course, the outputs of the sensors or other devices 34–39 are provided to the estimation unit 30. While not illustrated in FIG. 1, the output of the displacement sensor 39 may be used by the servo controller 16 to, for example, dampen the dynamic response of the positioner/valve device 13. If desired, the pressure sensors 36 may include or provide measurements of supply pressure and two output pressures generally provided by positioners which support piston actuators.

The estimation unit 30 may also or alternatively detect the set point signal, the error signal at the output of the summing junction 24, the error signal at the output of the summing junction 26, the process variable, the output of the transmitter 22 or any other signal or phenomena that causes or indicates movement or operation of the process control device 13 or is otherwise associated with the process control loop 10. It should also be noted that other types of process control devices may have other signals or phenomena associated therewith that may be used by the estimation unit 30.

As will be evident, the estimation unit 30 may read an indication of the controller command signal, the positioner servo output, the pressure signal from the I/P unit 17, the actuator pressure signals, the displacement of the second stage pneumatics 18, the valve position already provided by the position sensor 27, the stem travel, etc. Of course, the sensors used by the estimation unit 30 can be any known sensors and may be either analog or digital sensors. For example, the position sensor 27 may be any desired motion or position measuring device including, for example, a potentiometer, a linear variable differential transformer (LVDT), a rotary variable differential transformer (RVDT), a Hall effect motion sensor, a magneto resistive motion sensor, a variable capacitor motion sensor, etc. It will be understood that, if the sensors are analog sensors, the estimation unit 30 may include one or more analog-to-digital convertors which sample the analog signal and store the sampled signal in the memory 31 associated with the estimation unit 30. However, if the sensors are digital sensors, they may supply digital signals directly to the estimation unit 30 which may then store those signals in the memory 31 in any desired manner. Moreover, if two or more signals are being collected, the estimation unit 30 may store these signals in a random access portion of the memory 31 as components of data points associated with any particular time. For example, each data point at time $T_1, T_2, \ldots T_n$ may have an input command signal component, a pressure signal component, an actuator travel signal component, etc. Of course, these data points or components thereof may be stored in the memory 31 or any other memory in any desired or known manner.

While the estimation unit 30 has been indicated as being separate from the process control device 13 (such as, for example, being located in a host device), this unit can instead be internal to the process control device 13 or can be located on any other process control device (e.g., field device) in a process control network including handheld devices. If the process control device 13 is a micro-processor based device, the estimation unit 30 can share the same processor and memory as that already within the process control device 13. Alternatively, the estimation unit 30 may have its own processor and memory. Thus, it is contemplated that the analysis of the source of instabilities may be performed in the device in which the measurements are made (such as in any field device) with the results being sent to a user display or to a host device for use or, alternatively, the signal measurements may be made by a device (such as a field device or handheld unit) with such measurements then being sent to a remote location (such as a host device) where the instability analysis is performed.

The estimation unit 30 determines or estimates the source of instabilities, such as limit cycles, within the process control loop 10, the process control device 13 (or other device or portion of the process control loop 10) using one or more mathematical or statistical analyses based on measurements preferably taken while the process control device 13 or process control loop 10 is operating on-line within a process environment. In general, to determine the existence of or a source of instabilities, the estimation unit 30 samples one or more signals within, for example, the process control device 13 and stores the sampled data in memory. If desired, the estimation unit 30 may massage the data to eliminate unneeded data, outliers, etc. either before or after storing the collected data in memory. After collecting enough data to be able to determine the existence of or source of an instability, such as data from one or more entire limit cycles or data from a portion of a limit cycle, the estimation unit 30 uses one or more analysis routines 33, which may be stored in the memory 31 associated with the estimation unit 30 and implemented on the processor 32 within the estimation unit 30, to determine the existence of or source of the instability within the loop 10, device 13, etc. While the estimation unit 30 may use any desired statistical analysis routine or procedure, some example analysis routines for determining the existence of or source of limit cycles are described below, it being understood that these routines may be implemented using any appropriately written computer program or algorithm stored within and implemented by the estimation unit 30.

Furthermore, after determining the existence of or a potential source of an instability, the estimation unit 30 may display an indication of that instability or source on a display device 40 which may be, for example, a CRT screen, a printer, a voice generator, an alarm generator of any kind, or any other desired communication device either within the same device as the estimation unit 30 or another device communicatively connected to the estimation unit 30. Of course, the estimation unit 30 may alert the user as to the existence of or source of the instability in any other desired manner. If desired, the estimation unit 30 may make recommendations as to the manner in which to eliminate the instability based on the detected source, may suggest further diagnostics or actions to be performed with such recommendations or diagnostic produces being stored in the memory 31 and accessed based on, for example, the detected source of the instability.

Because the estimation unit 30 may take measurements of the required data while the process control device 13 is operating on-line, the estimation unit 30 does not necessarily require the process control device 13 to undergo a full stroke or test stroke sequence to detect the presence of or source of an instability and does not necessarily require the process control device 13 to be taken off-line or out of the normal operating environment. Furthermore, because the estimation unit 30 is connected to the process control loop 10 and measures the signals necessary to make the estimation of instabilities during normal operation of the process control loop 10, the estimation unit 30 may detect the presence of or the source of instabilities continuously without interfering with the operation of the process 20 or the process control loop 10.

While the estimation unit 30 may be programmed or configured to determine the existence of or the sources of instabilities using any desired analysis, particularly useful statistical approaches for some sources of instabilities are described in detail herein. However, the present invention is not limited to the use of any of these approaches and, furthermore, is not limited to the determination of estimates for only the specifically discussed sources of instabilities, it being understood that other mathematical approaches can by used to determine these or other sources of instabilities.

The estimation unit 30 may perform one or more analyses to detect the presence of or sources of instabilities within a process control loop or system at any desired time. Thus, if desired, the estimation unit 30 may be triggered manually by an operator when, for example, the operator notices an instability within a loop or a device. Alternatively or in addition, the estimation unit 30 may be triggered automatically. For example, the estimation unit 30 may use instability detection software 33A that may implement a short Fourier transform on one or more of the signals within the system, such as the actuator pressure or valve travel, and look at deviations in the spectrum of that signal. Power at unexpected or undesired frequencies may signal the presence of instabilities. Of course, the software may also or instead use any of a number of known, standard pattern recognition algorithms, may examine Lissajous or phase plain plots of time series data, etc. to detect the presence of instabilities such as limit cycles.

For example, instability detection routine 33A may use the Wiener-Khinchine relation to detect the presence of instabilities. Generally, the Wiener-Khinchine relation states that the area under the spectrum is proportional to the variance. Based on this principle, the detection software 33A may identify changes in the spectrum of a signal by calculating changes in the variance of the signal. Still further, the detection software 33A may look at the ratio of the variances between two signals, such as the command signal and the travel signal, i.e., may implement an F-test. If the system is operating properly, the ratio of variances will be approximately one because the gain between the command signal and the travel signal is approximately equal to one. However, if a servo loop instability forms, for example, from friction, negative gradients, or valve accessories, the ratio of variances will become very large. In other words, for a servo loop instability, the power out of the system will exceed the power put into the system.

Figure 2A:
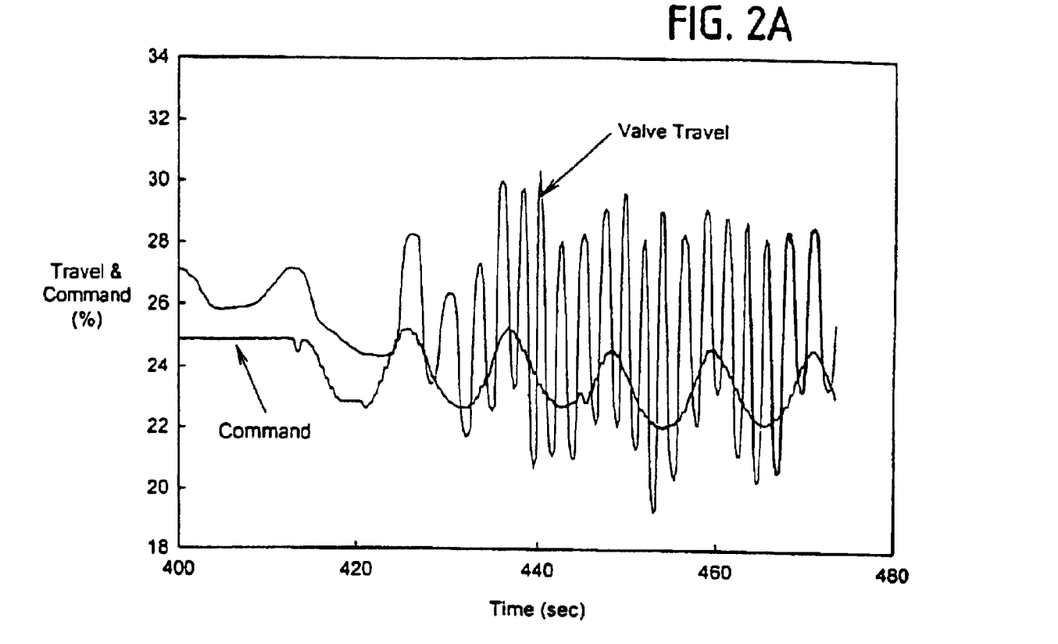
FIGS. 2A and 2B are graphs of a travel signal, a command signal and a net actuator pressure signal versus time for a system undergoing instabilities.
Figure 2B:
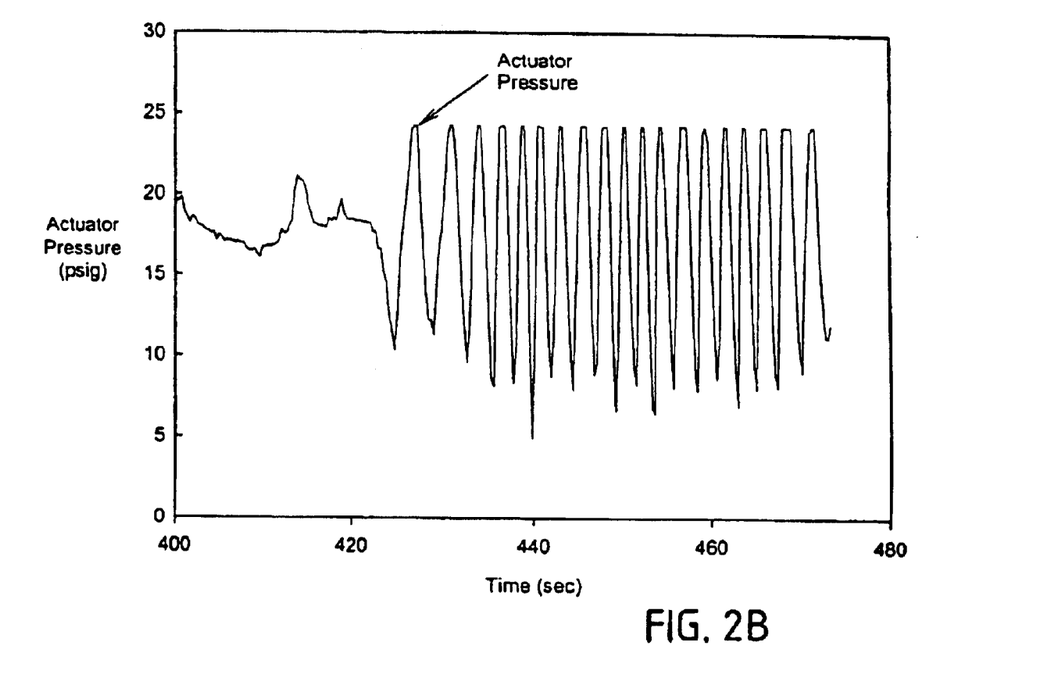
Figure 3A:
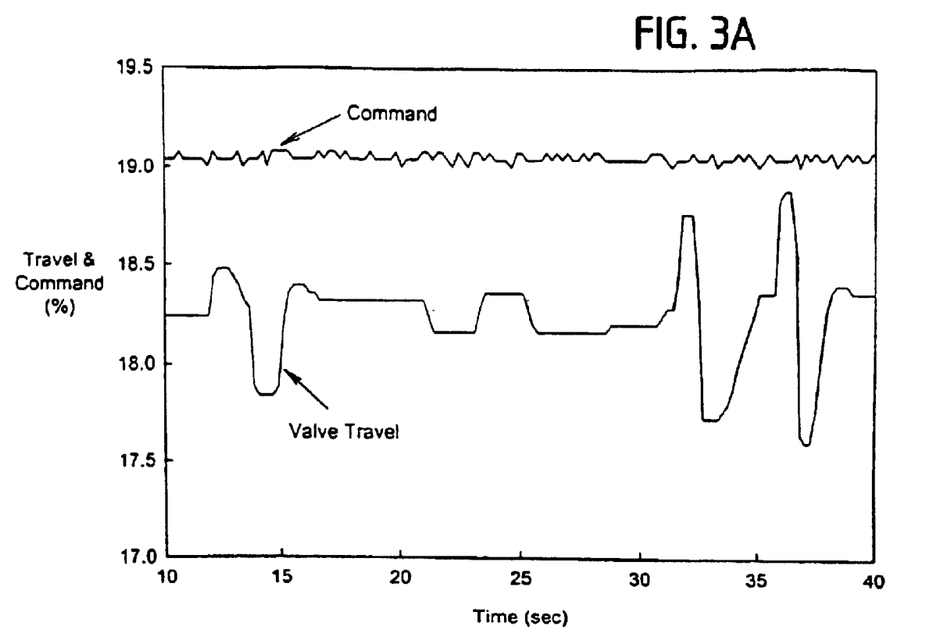
FIGS. 3A and 3B are graphs of a travel signal, a command signal and net actuator pressure signal versus time, indicating a friction induced instability.
Figure 3B:
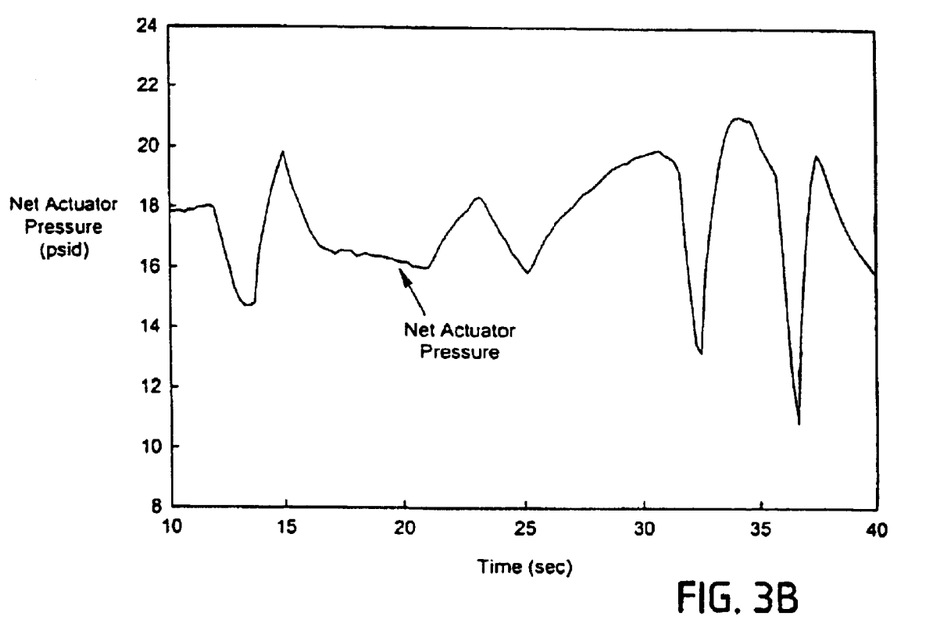
Figure 4A:
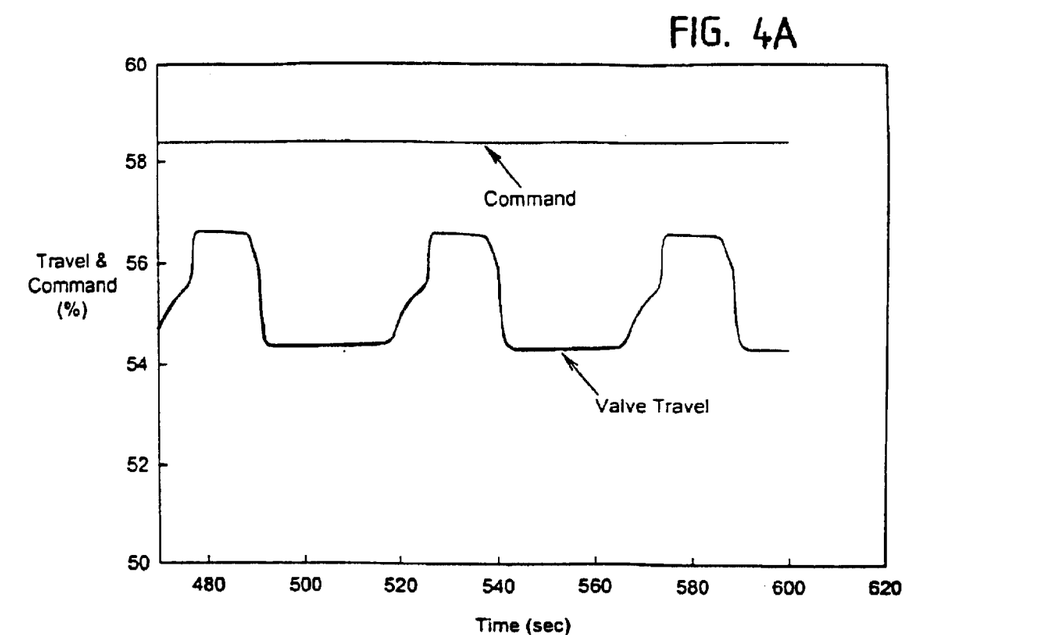
FIGS. 4A and 4B are graphs illustrating a travel signal, a command signal and a net actuator pressure signal versus time, indicating an instability caused by a negative gradient in a control valve with fail-closed spring action.
Figure 4B:
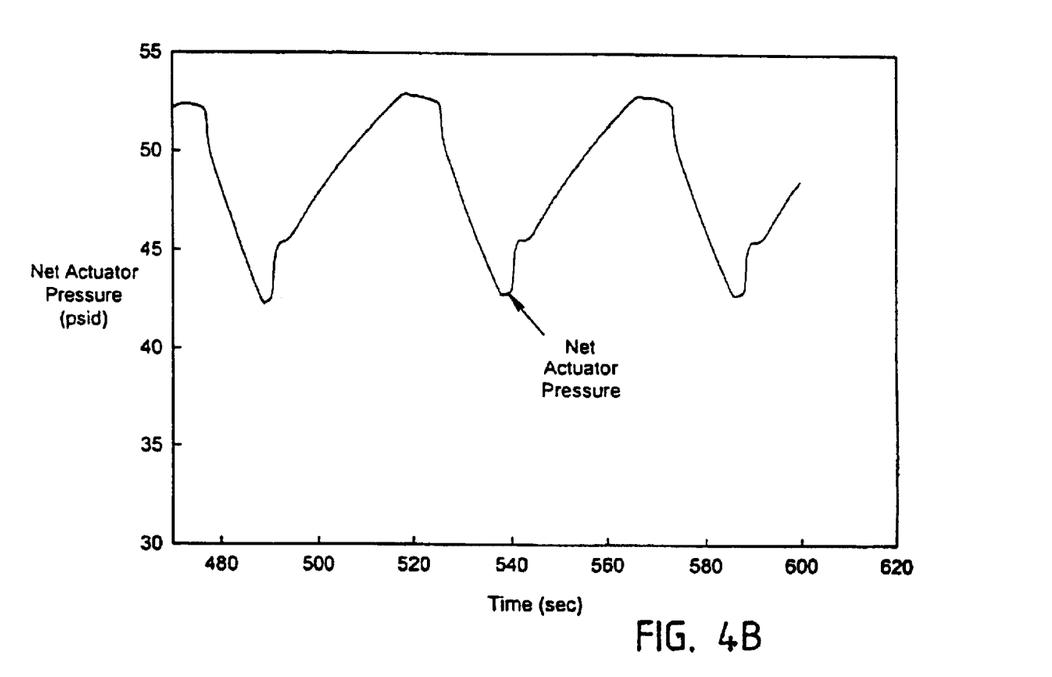
Figure 5A:
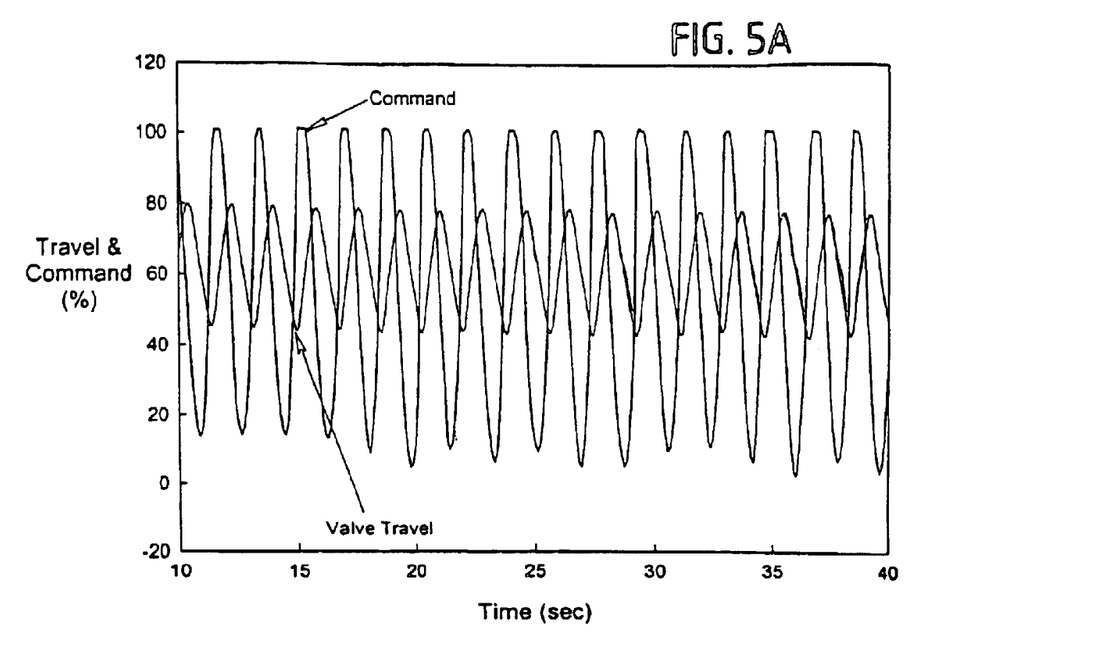
FIGS. 5A and 5B are graphs illustrating a travel signal, a command signal and a net actuator pressure signal versus time, indicating an instability caused by excessive gain in the process controller.
Figure 5B:
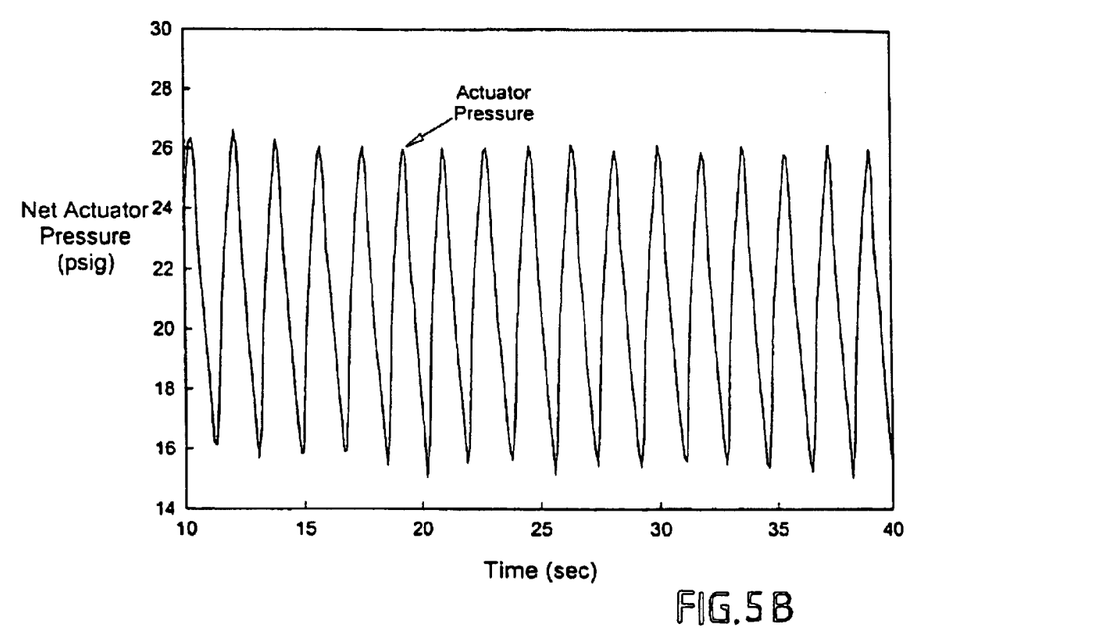

As an added benefit, this approach will not trigger an analysis if the outer process loop is cycling, which helps in stability discrimination. To expedite detection, the ratio of variances can be calculated recursively using "forgetting factors" so that only the most recent data are used. However, once a limit cycle is detected (by whatever means), the ratio of variances can be used to track down whether the problem is in the outer process control loop or in the inner servo control loop. If the ratio of variances is much greater than one, the source of the instability is most likely in the servo loop. The examples of FIGS. 2, 3 and 4 depict this case. Alternatively, if the ratio of variances is much less than one, the source of the instability is most likely in the process loop. The example of FIGS. 5A and 5B depicts this case.

If desired, the instability detection or discrimination algorithms can run continuously and detection can be flagged if the discrimination algorithm exceeds some threshold. For example, if the phase angles in the servo loop approach −180 degree, as discussed below, the estimation or detection software could trigger an alarm or otherwise notify an operator of an instability and its source.

Once an instability is detected, the source of this instability may be determined using one or more other software routines 33B, 33C, etc. One approach to determining an estimate of a source of an instability is to have the estimation unit 30 collect data pertaining to the actuator travel or position (sensed by, for example, the position sensor 27 of FIG. 1) and the actuator pressure (sensed by, for example, the pressure sensors 35 or 36 of FIG. 1) for the valve 15 over a particular time period. Typically, the collected data will be stored in memory as a series of data points, wherein each data point has an actuator pressure component derived from the measured actuator pressure signal and an actuator position component derived from the measured actuator position or travel signal. Of course, it will be understood that the actuator pressure and actuator position components of any data point should relate to the same time. Thus, it is preferable, when using two or more measured signals, to sample those signals at the same time to thereby produce time correlated data. In this manner, the estimation unit 30 collects data points associated with an input signal of the control loop or a portion of the loop and data points associated with an output signal of the control loop or portion of the loop and then uses these data points in any manner to form an input/output curve associated with the system or control loop. Of course, the data points associated with the input and output signals may be stored separately or together as desired but should generally be associated with the same or approximately the same time so as to form components of the input/output curve.

Next, the instability source estimation software 33B or 33C determines the source of an instability by analyzing the data in any of a number of manners including, for example, to determine if the instability is caused by the device itself or outside of the device, if the instability is caused by friction or by negative gradients on the valve plug or by mechanical anomalies.

In one embodiment, the source of an instability is determined from data collected within the servo loop, i.e., everything between the command signal and the valve travel signal of FIG. 1. Using these signals alone, the estimation unit 30 can track down the root cause of many instabilities in a particular system. The primary advantage of this technique is that analyses can be performed on-line with no a priori knowledge of the process, which significantly reduces the costs required to commission and maintain these types of diagnostics.

In one example analysis, the estimation software 33B or 33C can determine if a detected instability is caused by the process control loop or is, instead, caused by a source within the servo loop and, thus, a source within the device 13. In particular, when a process control loop enters a limit cycle, every component in the system cycles at the same frequency. Furthermore, if the system is cycling, the sum of phase angles among the successive dynamic components in the loop will be −180 degrees. As a result, if the sum of the phase angles within successive components of the servo loop of FIG. 1 is greater than −180 degrees, e.g., −90 degrees, then the servo loop is stable and is not the source of the instability. However, if the sum of the phase angles within the servo loop 13 is equal to or approximately equal to −180 degrees, then the source of the limit cycle is within the servo loop itself. The estimation routine 33B can determine the phase angles associated with the successive dynamic components of the servo loop 13 or any other portion of the process control loop 10 and add these phase angles together. If the sum of the phase angles is at or near −180 degrees, the cause of the limit cycle is within the servo loop or other portion of the process control loop 10. If the sum of the phase angles is significantly more than −180 degrees, then the servo loop or other section of the process control loop 10 is not the source of the limit cycle, although it might contribute significantly to the problems of the outer loop.

If desired, the estimation unit 30 can determine a phase lag introduced by each of a number of elements within a process control loop, such as for each of a number of successive elements in the servo loop 13, and then identify the element that introduces the most phase lag in the process control loop. If desired, the estimation unit 30 can order the elements according to the amount of phase lag each element introduces into the process control loop or can produce a cumulative phase lag chart indicting the detected phase lags for each of the elements. This information can be displayed to a user via the display device 40.

A simple example of a system that has an instability in the servo loop of a control valve with fail-open spring action is depicted in FIGS. 2A and 2B, which plots the input command signal, valve travel, and net actuator pressure versus time. In FIGS. 2–5, the signals at the end of or outside of the servo loop or device 13 are illustrated in the top graph while the signals completely within the servo loop or device 13 are illustrated in the bottom graph. From FIGS. 2A and 2B, it is evident that the process control loop, i.e., the outer loop, is active (as evidenced by the oscillation in the command signal) and is trying to correct for disturbances introduced by the control valve 15. The total phase angle between the error signal out of the summing junction 26 (i.e., the command signal minus valve travel) and valve travel is equal to about −180 degrees. This fact indicates that the instability is located within the servo loop.

Alternatively, the estimation unit 30 could look at the ratio of variances between two signals, such as the command input and valve travel or the command input and the actuator pressure. As noted above, if the system is operating properly, the ratio of variances will be approximately one because the gain between the command signal and the travel signal is approximately equal to one. However, if an instability within the servo loop forms, for example, from friction, negative gradients, or valve accessories, the ratio of variances will become very large. In other words, for a servo loop instability, the power out of the system will exceed the power put into the system. When the ratio of the variances is less than about one, then the instability is within the process loop. In the example of FIGS. 2A and 2B, the variance of valve travel exceeds the variance of the command input, which indicates that the instability is in the servo loop, i.e., because the variance of the valve travel is much greater than the variance of the command signal, the cause of the instability is determined to be within the servo loop.

There are many known methods of determining the phase and variances of each of the signals and these methods will not be discussed in detail herein. Furthermore, while the phases of each of a number of successive signals within, for example, a servo loop can be added together, the phases of the first and last signals in the loop, such as the error signal out of the summing junction 26 and the feedback signal from the position sensor 27 can be added to determine if the sum is approximately −180 degrees. Of course, the phases of each of the individual signals in the loop can be analyzed to see which signal is adding the most phase and may, therefore, be associated with the component causing the instability.

In another case, the estimation software 33C may determine if an instability is being caused by friction or external forces, such as negative gradients on the valve plug. Generally speaking, the estimation software 33C can identify friction or external forces as the source of an instability by examining the correlation and/or the lead/lag relationship between relevant pressure and travel signals. For example, in the case of a sliding stem valve, the estimation software 33C can use the actuator pressure as detected by the pressure sensor 36 and the valve travel as detected by the position sensor 27. Using the data collected from the pressure sensor 36 and the position sensor 27 for the valve 15 over a period of time, the estimation software 33C determines whether there is a negative or positive correlation between the pressure and travel responses. In the case of a negative correlation, where an increase in travel is accompanied by a decrease in pressure, or a decrease in travel is accompanied by an increase in pressure, the instabilities are due to external forces. This negative correlation results from the fact that the servo controller 16 is attempting to compensate for sudden changes in the position of the valve stem by trying to force the valve stem to travel in the opposite direction. As can be seen in FIGS. 3A and 3B, the net actuator pressure increases with a decrease in valve travel. In particular, in FIGS. 3A and 3B, an instability caused by external forces, such as buffeting or jet streams within the valve 15 occurs between the times 12 sec. and 15 sec. At time 12 sec., the valve stem moves in the increasing direction as a result of buffeting. The actuator pressure begins to decrease almost immediately. The net actuator pressure continues to decrease even after the valve travel has leveled off to drive the valve back to its original position. However, when the value travel decreases (at about 13.5 sec.) to below its starting point, the actuator pressure increases to drive the valve back to its original point. Thus, here, the incidence of an increase in valve travel is correlated with a decrease in actuator pressure and vice-versa, meaning that external forces are causing oscillation within the servo loop. Similar negatively correlated oscillations occur in FIGS. 3A and 3B at approximately 22 sec. and 32 sec.

In the case of a positive correlation, where an increase in pressure is accompanied by an increase in travel or a decrease in pressure is accompanied by a decrease in travel, the estimation software 33C determines that the instabilities are friction induced because the positioner 15 is attempting to move the valve stem in the increasing direction by increasing the pressure on the valve stem (or is attempting to move the valve stem in the decreasing direction by decreasing the pressure on the valve stem) until movement occurs. FIGS. 4A and 4B illustrates this phenomena. For example, beginning at about 492 seconds, the net actuator pressure increases as the servo controller 16 attempts to correct the error signal between the reference (set point) and the travel. Because the valve stem is stuck within the friction band, it does not move. At approximately 518 seconds, the net pressure on the valve stem exceeds the friction threshold and the valve stem begins to move in the increasing direction. At this time, the net actuator pressure decreases due to volume changes within the actuator which slows down the travel response. However, even though the net force decreases and the valve velocity approaches zero, the travel suddenly jumps to a local maximum value as friction breaks down. The same process occurs as the net pressure decreases, (e.g., between 526 and 538 seconds), although the travel response (in the decreasing direction) during this time is more pronounced. Thus, in this case, an increase in actuator pressure results in an increase in valve travel and a decrease in actuator pressure results in or is associated with decreasing valve travel.

Thus, by determining whether actuator pressure and valve travel are positively or are negatively correlated, the estimation software 33C can determine whether the source of a limit cycle is due to external forces or friction within the valve. Of course, it will understood that positive correlation occurs when the actuator pressure moves in a direction which would normally cause movement of the valve stem in the measured direction while negative correlation occurs when the actuator pressure moves in a direction that is opposite from the direction that would normally cause movement of the valve stem in the measured direction. Thus, in certain actuator/valve configurations or depending on the manner in which "decreasing" valve travel is defined, increasing actuator pressure and "decreasing" valve travel may still be positively correlated.

An alternative way of distinguishing between frictionally and externally induced instabilities is by examining the lead/lag relationship between the pressure response and the travel response. If the pressure response lags the travel response, the instability is due to external forces because the servo controller 16 is acting in response to a change in valve position. Alternatively, if the travel response lags the pressure response, the instability is friction induced because the servo controller 16 is trying to force valve movement. As can be seen in FIGS. 4A and 4B, beginning at approximately 492 seconds, the pressure increases with no corresponding movement of the valve 18 until the time 518 seconds, when the pressure response is able to overcome the friction and move the valve 18. The same phenomena occurs at time 526 seconds when the pressure decreases with no change in valve position until the time 538 seconds, when the friction force is overcome causing downward travel of the valve stem. In this case, the command signal to the valve (not shown) was held constant. Notice that the phase angle between net pressure and valve travel is approximately −180 deg with travel lagging net pressure, which means that the instability is in the servo loop and the problem lies between the actuator and the valve stem.

Alternatively, as indicated above, FIGS. 3A and 3B shows a time series plot of a valve with a negative gradient. In this trace, the command signal to the valve has been held approximately constant. Because this is not a strong gradient, the instability is not periodic. None-the-less, the system is unstable in the sense of Lyapunov (i.e., there is no equilibrium point). Here, the negative gradients can be discerned by looking at the phase shift between pressure and travel. For a negative gradient, the valve stem will move first and then the positioner will try to correct the response. Put simply, actuator pressure lags behind travel. This is in stark contrast with friction induced instabilities in which actuator pressure leads travel.

To determine a lead/lag relationship, the estimation software 33C may use a start point, an end point, a mid-point, or some other statistical measure of when the pressure signal starts or ends and when the travel signal starts or ends and may then compare these two points to determine which of the pressure and travel signals leads or lags the other. Of course, if desired, the estimation routine 33c may determine the source of instabilities by measuring or determining one or both of the correlation between the travel and pressure measurements and the lead/lag relationship between the travel and pressure measurements.

Another simple stability analysis that can be performed by the software 33 to detect the presence or source of instabilities looks at the number of reversals in a signal or the differences in the number of reversals in different signals, such as the valve travel, actuator pressure signals, command signals, etc., over a given period of time. For a servo loop instability, the number of reversals in the travel signal will greatly exceed the number of reversals in the command signal (see FIGS. 2A and 2B). For a process instability, the number of reversals in travel will be approximately equal to the number of reversals in the command signal (see FIGS. 5A and 5B). This same analysis can be applied to other signals to detect the presence of an instability in an element between the components associated with those signals.

FIGS. 5A and 5B illustrate a still further example in which the estimation unit 30 may use the above techniques to determine the source of an instability as being outside of the servo loop. In FIGS. 5A and 5B, the instability is caused by excessive gain, i.e., excessive gain within the process controller 12 of FIG. 1, when used in conjunction with a valve having fail-closed spring action. Here, the ratio of the variances of the command signal to the valve travel is less than one, indicating that the source of the problem is outside of the servo loop. Likewise, the sum of the phase angles within the servo loop is approximately −90 degrees, again indicating that the source of the instability is outside of the servo loop.

While the estimation unit 30 has been described herein as detecting and determining an estimate or potential cause of instabilities within a process control device, such as a valve device, it will be understood that other analyses can be used to determine estimates for these instabilities or other instabilities for other process control devices, process control loops, etc. based on data measured on-line within a process or a process control loop.

Likewise, it will be understood that the estimation unit 30 may be implemented as any desired hardwired logic device or software controlled processing device, such as a microprocessor, that is capable of detecting and storing one or more signals, and performing a statistical or mathematical analysis on such signals. Preferably, the statistical analysis is performed by programming (of any desired type) stored within a computer-readable memory of the estimation unit 30. However, the analysis steps described herein or otherwise used may be implemented in software, hardware, firmware, or any combination thereof in any desired manner.

While the present invention has been described with reference to specific examples, which are intended to be illustrative only, and not to be limiting of the invention, it will be apparent to those of ordinary skill in the art that changes, additions or deletions may be made to the disclosed embodiments without departing from the spirit and scope of the invention.

What is claimed is:

1. A method of determining the existence of an instability within a process control loop using a process control device comprising the steps of:
   measuring one or more signals within the process control loop when the process control loop and the process control device are connected on-line and continuously in service under normal operating conditions within a process control environment;
   storing the one or more measured signals as signal data; and
   performing an analysis on the stored signal data to determine the existence of an instability within the process control loop.

2. The method of claim 1, wherein the step of measuring includes the step of measuring two signals and the step of performing an analysis includes the steps detecting the number of reversals in each of the two signals over a particular period of time and determining the difference in the number of reversals in the two signals over the particular period of time.

3. The method of claim 1, wherein the step of performing an analysis includes the step of performing a Fourier transform on the one or more signals and detecting changes in the spectrum of the one or more signals to determine the existence of an instability.

4. The method of claim 1, wherein the step of performing an analysis includes the step of using the Wiener-Khinchine relation to determine the existence of an instability.

5. The method of claim 4, wherein the step of using the Wiener-Khinchine relation includes the step or identifying changes in the spectrum of the one or more signals by calculating changes in the variance of the one or more signals.

6. The method or claim 1, wherein the step of measuring includes the step of measuring two signals and wherein the step of performing an analysis includes the step of determining the variance of the two signals, calculating the ratio of the variances of the two signals and comparing the ratio to a preset value in determine the existence of in instability.

7. The method of claim 6, wherein the step of measuring includes the steps of measuring a command signal and a travel signal.

8. The method of claim 6, wherein the step of calculating includes the step of calculating the ratio of the variances of the two signals recursively.

9. The method of claim 8, wherein the step of calculating the ratio of of the variance or the two signals recursively includes the step of using forgetting factors.

10. A system to be used in a process control environment to determine an existence of an instability within a process control loop, the system comprising:
    a computer readable memory;
    a first routine stored on the computer readable memory and adapted to be executed on a processor to collect and store data indicative of one or more signals associated with the process control loop and the process control device while operating on line and continuously in service under normal operating conditions within the process control environment; and
    a second routine stored on the computer readable memory and adapted to be executed on a processor to perform a statistical analysis on the stored data to determine the existence of an instability within the process control loop.

11. The system of claim 10, wherein the second routine is adapted to use the data indicative of the one or more signals to determine a phase lag introduced by each of a number of elements into a process control loop and to identify the element that introduces the most phase lag into the process control loop.

12. The system of claim 10, wherein the second routine is adapted to use the data indicative of the one or more signals to determine a phase lag introduced by each of a number of elements within a process control loop and to order the elements according to the amount of phase lag each element introduces into the process control loop.

13. The system of claim 10, wherein, the second routine is adapted to use the data indicative of the one or mare signals to determine a phase lag introduced by each of a number of elements within a process control loop and to provide a cumulative phase lag chart indicting the detected phase lags.

14. The system of claim 10, wherein the first routine is adapted to collect and store data indicative of first and second signals and wherein the second routine is adapted to identify a lead/lag relationship between the first and the second signals and to determine the source of the instability based on the determined lead/lag relationship.

15. The system of claim 14, wherein the first signal is a pressure signal and the second signal is a travel signal and wherein the second routine is adapted to identify the source of the instability as fraction when the pressure signal leads the travel signal.

16. The system of claim 14, wherein the first signal is a pressure signal and the second signal is a travel signal and wherein the second routine is adapted to identity the source of the instability as an external force when the pressure signal lags the travel signal.

17. The system of claim 10, wherein the first routine is adapted to collect and store data indicative or first and second signals and wherein the second routine is adapted to identify a positive or a negative correlation between the first and the second signals and to determine the source of the instability based on the determined correlation.

18. The system of claim 17, wherein the first signal is a pressure signal and the second signal is a travel signal and wherein the second routine is adapted to identify the source of the instability as friction when the pressure signal is positively correlated to the travel signal.

19. The system of claim 17, wherein the first signal is a pressure signal and the second signal is a travel signal and wherein the second routine is adapted to identify the source of the instability as an external force when the pressure signal is negatively correlated to the travel signal.

20. The system of claim 10, wherein the first routine is adapted to collect and store data indicative of first and second signals and wherein the second routine is adapted to sum the phases of the first and second signals together to produce a summed phase signal and to compare the summed phase signal to a threshold to identify the source of the instability.

21. The system of claim 20, wherein the second routine is adapted to determine that the source of the instability is in a component between the first and second signals when the summed phase signal is approximately equal to −180 degrees.

22. The system of claim 10, wherein the first routine is adapted to collect and store data pertaining to two signals and wherein the second routine is adapted to detect the number of reversals in each of the two signals over a particular period of time and to determine the difference in the number of reversals in the two signals over the particular period or time.

23. The system of claim 10, wherein the second routine is adapted to perform a Fourier transform on the one or more signals and to detect changes in the spectrum of the one or more signals to identify the existence of an instability.

24. The system of claim 10, wherein the second routine is adapted to use the Wiener-Khinchine relation to determine the existence of an instability.

25. The system of claim 24, wherein the second routine identifies changes in the spectrum of the one or more signals by calculating changes in the variance of the one or more signals.

26. The system of claim 10, wherein the first routine is adapted to collect and store data pertaining to two signals and wherein the second routine is adapted to determine the variance of the two signals calculate the ratio of the variances of the two signals and compare the ratio to a preset value to determine the existence of an instability.

27. The system of claim 26, wherein the second routine is adapted to calculate the ratio of the variances of the two signals recursively.

28. The system of claim 26, wherein the second routine is adapted to calculate the ratio of the variances recursively using forgetting factors.

* * * * *

UNITED STATES PATENT AND TRADEMARK OFFICE
CERTIFICATE OF CORRECTION

PATENT NO. : 6,804,618 B2
DATED : October 12, 2004
INVENTOR(S) : Kenneth W. Junk It is certified that error appears in the above-identified patent and that said Letters Patent is hereby corrected as shown below:

<u>Title page</u>,
Item [22], PCT Filed, please delete "December 5, 2001" and insert
-- November 5, 2001 --.
Item [56], References Cited, OTHER PUBLICATIONS,
"Prepared by Foster-Miller, Inc.," reference, please delete "-operated" and insert
-- operated --.
"Dimmick et al.," reference, please delete "Aug. 1996" and insert -- Aug. 1986 --.
"U.S. patent application Ser. No. 06/913,193 entitled" reference, please delete
"-operated" and insert -- operated --.

<u>Column 7</u>,
Line 60, please delete "can by" and insert -- can be --.

<u>Column 9</u>,
Line 65, please delete "indicting" and insert -- indicating --.

<u>Column 11</u>,
Line 31, please delete "illustrates" and insert -- illustrate --.

<u>Column 13</u>,
Line 66, please delete "or" and insert -- of --.

<u>Column 14</u>,
Line 4, please delete "in" and insert -- an --.
Line 12, please delete "of of the variance" and insert -- of the variance --.
Line 42, please delete "wherein," and insert -- wherein --.
Line 43, please delete "mare" and insert -- more --.
Line 46, please delete "indicting" and insert -- indicating --.
Line 57, please delete "fraction" and insert -- friction --.
Line 65, please delete "or" and insert -- of --.

UNITED STATES PATENT AND TRADEMARK OFFICE
CERTIFICATE OF CORRECTION

PATENT NO.   : 6,804,618 B2
DATED        : October 12, 2004
INVENTOR(S)  : Kenneth W. Junk It is certified that error appears in the above-identified patent and that said Letters Patent is hereby corrected as shown below:

Column 16,
Line 3, please delete "or" and insert -- of --.
Line 18, please delete "signals" and insert -- signals, --.

Signed and Sealed this

Twenty-fourth Day of May, 2005

JON W. DUDAS
*Director of the United States Patent and Trademark Office*